United States Patent
Joung

(10) Patent No.: US 9,012,843 B2
(45) Date of Patent: Apr. 21, 2015

(54) PORTABLE RADIATION DETECTION SYSTEM

(71) Applicant: Nutec Solutions, Inc., Bellevue, WA (US)

(72) Inventor: Jinhun Joung, Bellevue, WA (US)

(73) Assignee: Nutec Solutions, Inc., Bellevue, WA (US)

(*) Notice: Subject to any disclaimer, the term of this patent is extended or adjusted under 35 U.S.C. 154(b) by 244 days.

(21) Appl. No.: 13/960,183

(22) Filed: Aug. 6, 2013

(65) Prior Publication Data

US 2015/0041651 A1    Feb. 12, 2015

(51) Int. Cl.
*G01J 1/00*    (2006.01)
*G01T 7/00*    (2006.01)
*G01T 3/00*    (2006.01)
*G01T 1/36*    (2006.01)

(52) U.S. Cl.
CPC ... *G01T 7/00* (2013.01); *G01T 3/00* (2013.01); *G01T 1/36* (2013.01)

(58) Field of Classification Search
CPC .................................. G01T 7/00; G01T 1/18
USPC .......................................... 250/336.1, 336.2
See application file for complete search history.

(56) References Cited

U.S. PATENT DOCUMENTS

| | | | |
|---|---|---|---|
| 4,506,745 A * | 3/1985 | Bjor | 175/45 |
| 5,258,926 A * | 11/1993 | Duftschmid et al. | 250/375 |
| 6,781,134 B1 * | 8/2004 | Murray et al. | 250/370.13 |
| 2006/0097171 A1 * | 5/2006 | Balchunas et al. | 250/336.1 |
| 2006/0266948 A1 * | 11/2006 | Hofstetter et al. | 250/370.01 |
| 2011/0283190 A1 * | 11/2011 | Poltorak | 715/716 |

* cited by examiner

*Primary Examiner* — Kiho Kim
(74) *Attorney, Agent, or Firm* — Levenfeld Pearlstein, LLC

(57) ABSTRACT

A hand-held portable radiation detection device, such as a radiation isotopic identification device (RIID), is integrated with a personal digital assistant device (PDA), such as a smart phone, to provide with improved data processing capability and user interface. The PDA is configured to receive and process data received from the radiation detection device.

17 Claims, 10 Drawing Sheets

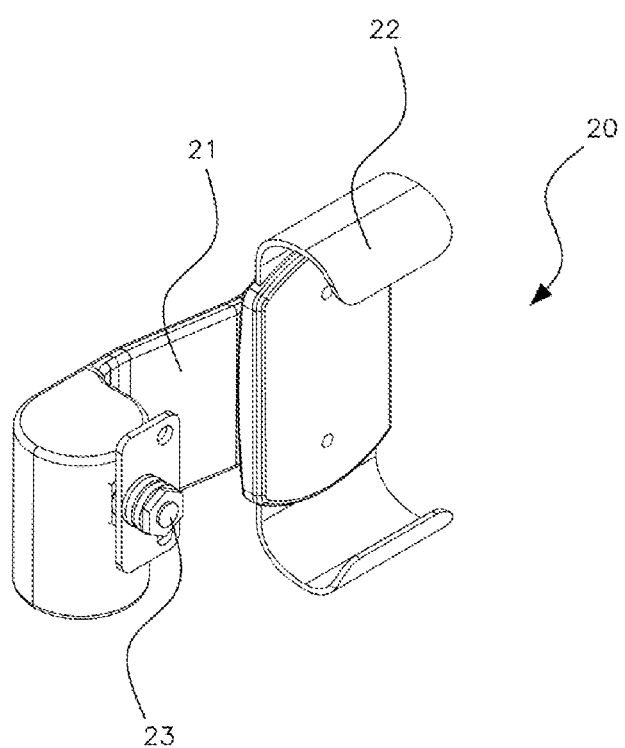

PORTABLE RADIATION DETECTION SYSTEM

BACKGROUND

The present disclosure relates to radiation detection systems, and more particularly a portable radiation detection system that can detect gamma-ray radiation and identify radiation generating radioisotopes.

Nuclear and radiological terrorism, which includes attacks utilizing nuclear or radiological devices or direct attacks upon nuclear facilities, is a real and growing threat. As a result, nuclear and radiological security remains a top priority for the United States and other countries.

Portable radiation detecting devices include Spectroscopic Personal Radiation Detectors (SPRDs) and Radiation Isotopic Identification Devices (RIIDs). These devices are configured to meet the standards for such devices as defined by the Institute for Electrical and Electronic Engineers (IEEE) and accredited by the American National Standards Institute (ANSI). Also included are spectroscopic backpack devices, which can be carried by a user in a backpack configuration and detect gamma-ray radiation and identify radiation generating radionuclides.

RIIDs are handheld devices that typically vary in weight from less than three pounds to greater than five pounds. RIIDs detect gamma-ray radiation and provide information about radiation strength as well as gamma-ray spectroscopic information. The gamma-ray spectroscopic information is analyzed by an analysis software to read the spectrographic "fingerprint" of radiation produced in order to identify the gamma-ray emitting radionuclides present in the object under examination. RIIDs are often equipped with neutron detectors.

SPRDs are small devices that can be worn by an operator (e.g. on the belt or in the pocket). SPRDs detect gamma-ray radiation and provide information about radiation strength as well as gamma-ray spectroscopic information. The gamma-ray spectroscopic information may be used to provide identification of radionuclides. SPRDs may also be equipped with neutron detectors. The SPRD is in a smaller format than the RIID and has a correspondingly smaller detector, and thus, has a limited sensitivity when compared to a RIID.

Spectroscopic backpacks are devices that are installed in a backpack configuration and are worn by users. Spectroscopic backpacks detect gamma-ray radiation and provide information about radiation strength as well as gamma-ray spectroscopic information. Spectroscopic backpacks perform the same functions as RIIDs but typically range in weight from less than ten pounds up to twenty-five pounds or more. With a larger gamma-ray spectroscopic detector, a spectroscopic backpack can provide a better sensitivity to detect radiation than RIIDs. Spectroscopic backpacks are often equipped with neutron detectors.

In addition to the use in the field of nuclear and radiological terrorism (Homeland Security), RIIDs may also be used for other radiation measurement applications, such as nuclear power plants, border control (border police), cargo inspection, emergency response, nuclear medicine, metal reprocessing, and more.

Conventional RIIDs deploy a "one box" system approach. In such an approach the system includes a radiation detection subsystem(s), which detects radiation and generates digital data of radiation, and a data processing subsystem(s), which processes the data generated by the radiation detection subsystem(s). The design of such a radiation detection subsystem(s) requires expertise in radiation measurement instrumentation. The data processing subsystem(s) is often configured to provide a user interface, means for communication, and/or a visual display of data. As such, the data processing subsystem(s) may include components such as a display(s), digital processing unit(s), data storage unit(s), keypads, control devices, communication unit(s), and other necessary components to support system operation.

Thus, manufacturers of such "one-box" RIID systems are required to integrate individual components and subsystems to enable necessary functions within a "one-box" system. However, the current market size for RIID systems is only measured in hundreds of units per year. Therefore, the "one-box" RIID systems do not have the scale of manufacture to drive cost-effective designs for powerful computing, display, and communication features. Further, ruggedness, portability, improved and standardized connection to computer systems, computing power to enable enhanced algorithms for better radiation detection and radionuclide identification, enhanced and standardized communications, standardized and user-friendly user interface and controls are highly desirable characteristics for these instruments. Therefore, there is a need for an affordable RIID system including improved user interface, computing and communication functions.

BRIEF SUMMARY

The current size of the market for PDAs and similar units are measured in millions of units per year. This large market revenue results in PDAs, smart phones, and similar devices that are thoroughly engineered to be rugged, highly portable, powerful in computing power, low in power consumption, flexible in operation, and low in cost. These units also possess highly developed user interfaces that are familiar to the general public and communications that are standardized and flexible. Thus, hand-held portable radiation detection systems including a commercially available PDA integrated therein are provided according to various embodiments to provide improved user interface and data processing capability, such as spectrum analysis and specific radionuclide identification.

In one aspect, a portable radiation detection system including a radiation detection subsystem, a PDA, and a mounting unit is provided. The radiation detection subsystem includes at least one radiation detector, a signal processing unit, and a communication unit. The at least one radiation detector is configured to detect radiation and generate electronic signals, and the signal processing unit is configured to process the electronic signals and generate digitized data. The first communication unit transmits the digitized data to the PDA. The PDA also includes a signal processing unit, a communication unit and a user interface. The communication unit of the PDA is configured to communicate with the communication unit of the radiation detection subsystem to receive the digitized data, and the signal processing unit of the PDA is configured to process the digitized data received from the radiation detection subsystem. The mounting unit is attached to the radiation detection subsystem and configured to hold the PDA.

The at least one radiation detector may include a gamma-ray detector having gamma-ray spectroscopic radiation measurement capability, a gas tube based gamma detector for measuring high count-rate gamma-ray radiation, and a neutron detector for measuring neutron radiation. Further, the radiation detection subsystem includes a high voltage module configured to supply high voltage power to the at least one radiation detector.

In one embodiment, the signal processing unit of the PDA is configured to perform spectroscopic analysis, radionuclide identification process, and database management function. Further, the signal processing unit of the PDA may generate event log files after processing the digitized data received from the radiation detection subsystem through the spectroscopic analysis and the radionuclide identification process. In some embodiments, the event log files are transmitted to a remote computer system for consolidated analysis and management of data from multiple portable radiation detection systems.

In one embodiment, the PDA user interface unit includes a keypad, a display and a camera. The PDA may be configured to receive user input via the user interface unit and generate/transmit signals to the radiation detection subsystem to control configurations of the radiation detection subsystem including calibration, background measurement, stabilization, and configuration parameter setup. Further, the built-in PDA camera may be used to take pictures and/or videos of a target and/or surrounding environment, which may be saved in the event log files. The event log files may be transmitted to a command center for generating a radiation event map. The PDA may also include a global positioning system (GPS), in which the PDA signal processing unit is configured to generate event log files including a corresponding location information received from the GPS, which may be transmitted to the command center for generating the radiation event map.

In an embodiment, the radiation detection subsystem includes an outer casing and a recessed portion defined therein. The recessed portion is configured to receive the PDA when in a closed position. The mounting unit may include a hinge, a holder, and an attachment element, in which the holder is attached to one end of the hinge, and the radiation detection subsystem is attached to the opposite end of the hinge via the attachment element. The holder is configured to hold the PDA. The mounting unit may be attached to the outer casing approximate the recessed portion, such that the PDA in the holder can be opened and closed by a movement of the mounting unit, and the PDA can be positioned in the recessed portion in the closed position. Further, the mounting unit may be configured to provide a flip motion to open and close the PDA, a tilt motion to adjust a position of the PDA, and a rotational movement for changing the holding position of the PDA between a horizontal holding position and a vertical holding position.

Further, the radiation detection subsystem may include a calibration aid unit and a laser unit for guiding measuring direction.

In one embodiment, the radiation detection subsystem is a radiation isotopic identification device (RIID), and the PDA is a smart phone.

Other aspects, objectives and advantages will become more apparent from the following detailed description when taken in conjunction with the accompanying drawings.

BRIEF DESCRIPTION OF THE SEVERAL VIEWS OF THE DRAWINGS

The benefits and advantages of the present embodiments will become more readily apparent to those of ordinary skill in the relevant art after reviewing the following detailed description and accompanying drawings, wherein:

FIG. 10 is a perspective view of a PDA mounting unit according to an embodiment.

DETAILED DESCRIPTION

Figure 1:
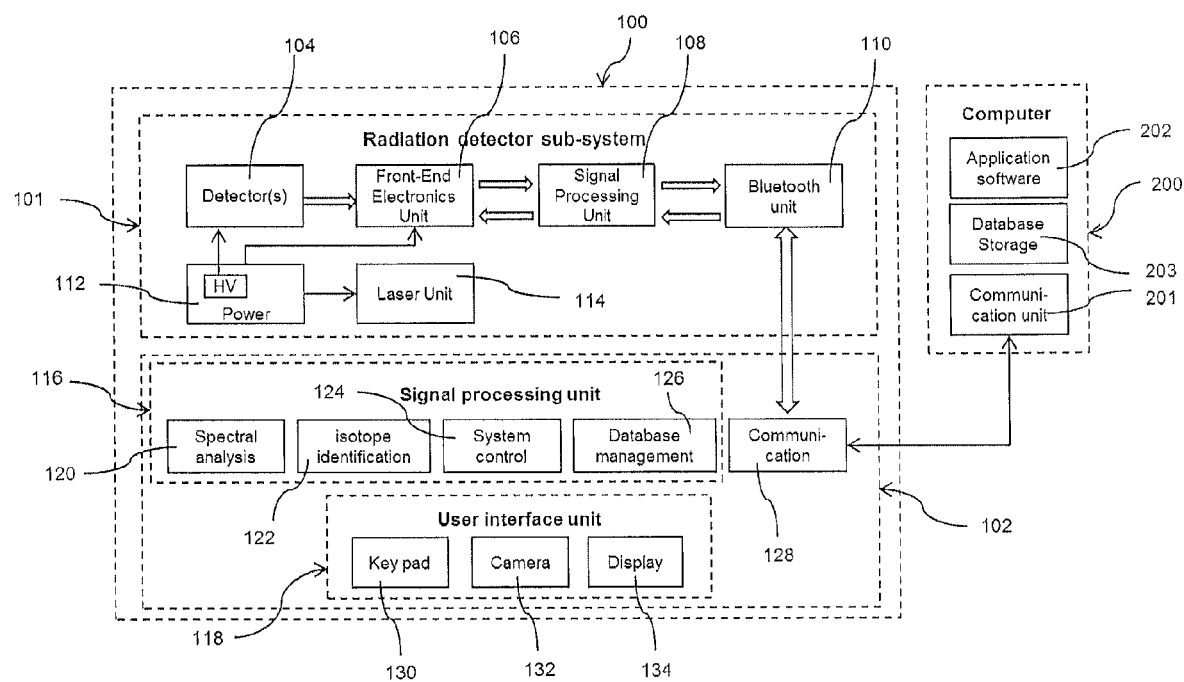
FIG. 1 is a schematic diagram a portable radiation detection system including a radiation detection subsystem and a PDA according to an embodiment.

While the present disclosure is susceptible of embodiment in various forms, there is shown in the drawings and will hereinafter be described a presently preferred embodiment with the understanding that the present disclosure is to be considered an exemplification and is not intended to limit the disclosure to the specific embodiment illustrated.

Referring to FIG. 1, a schematic diagram of a hand-held portable radiation detection system 100 according to an embodiment is provided. The hand-held portable radiation detection system 100 generally includes two major subsystems, namely, a radiation detection subsystem 101 and a PDA 102, such as a smart phone or other similar devices. The radiation detection subsystem 101 may generally include at least one radiation detector 104, a front-end electronics unit 106, a signal processing unit 108, a wireless communication unit such as a Bluetooth unit 110, a high voltage power module 112, and a laser unit 114. The PDA 102 may generally include a PDA signal processing unit 116, a user interface unit 118, and a communication unit 128. The PDA signal processing unit 116 may be configured to perform spectral analysis 120, isotope identification 122, system control 124, and database management 126. The user interface unit 118 may include a key pad 130, a camera 132, and a display 134. A computer system 200 may be provided as a supplementary subsystem for data storage, consolidated management and analysis of data from multiple hand-held portable radiation measurement systems. The computing system 200 may include an application software 202, a database storage 204, and a communication unit 201.

Figure 2:
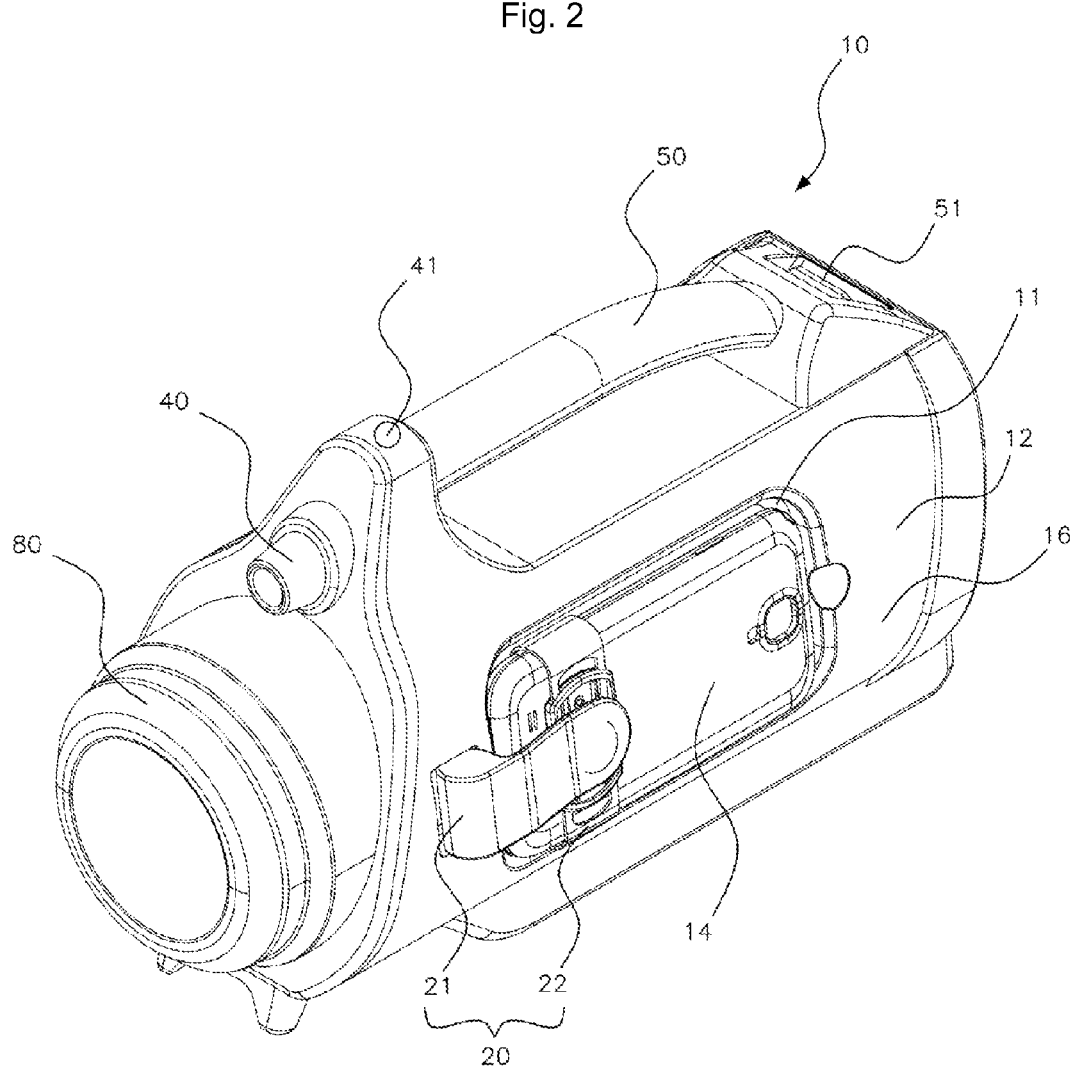
FIG. 2 is a top, front perspective view of a hand-held portable system including a RIID and a PDA integrated therewith according to an embodiment.

FIGS. 2-9 show an embodiment of a hand-held portable radiation detection system 10. As shown in FIG. 2, the hand-held portable radiation detector system 10 generally includes a radiation detection subsystem 12 and a PDA 14, which is removably attached to the radiation detection subsystem 12 via a mounting unit 20. The mounting unit 20 may be configured to hold the PDA 14 and provide for flip, tilt and rotation movements.

Figure 3:
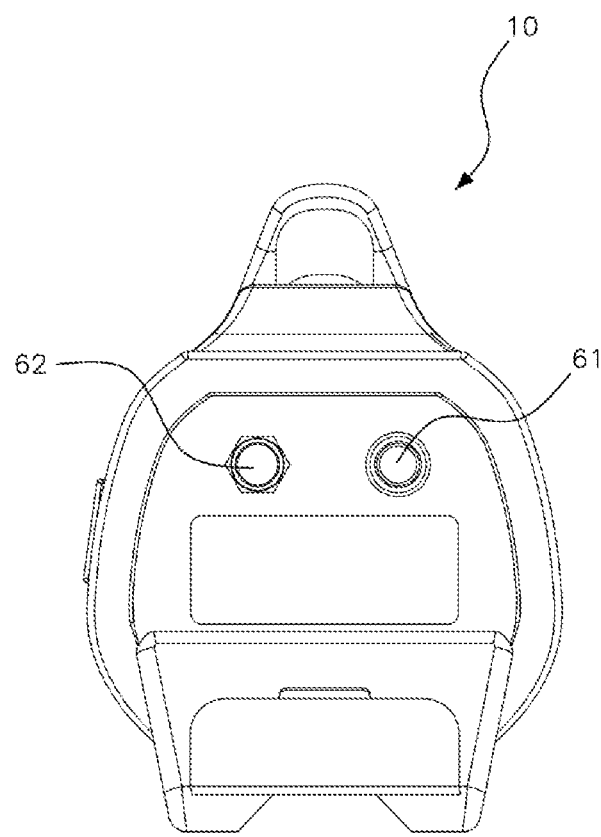
FIG. 3 is a rear view of the hand-held portable system of FIG. 1.
Figure 4:
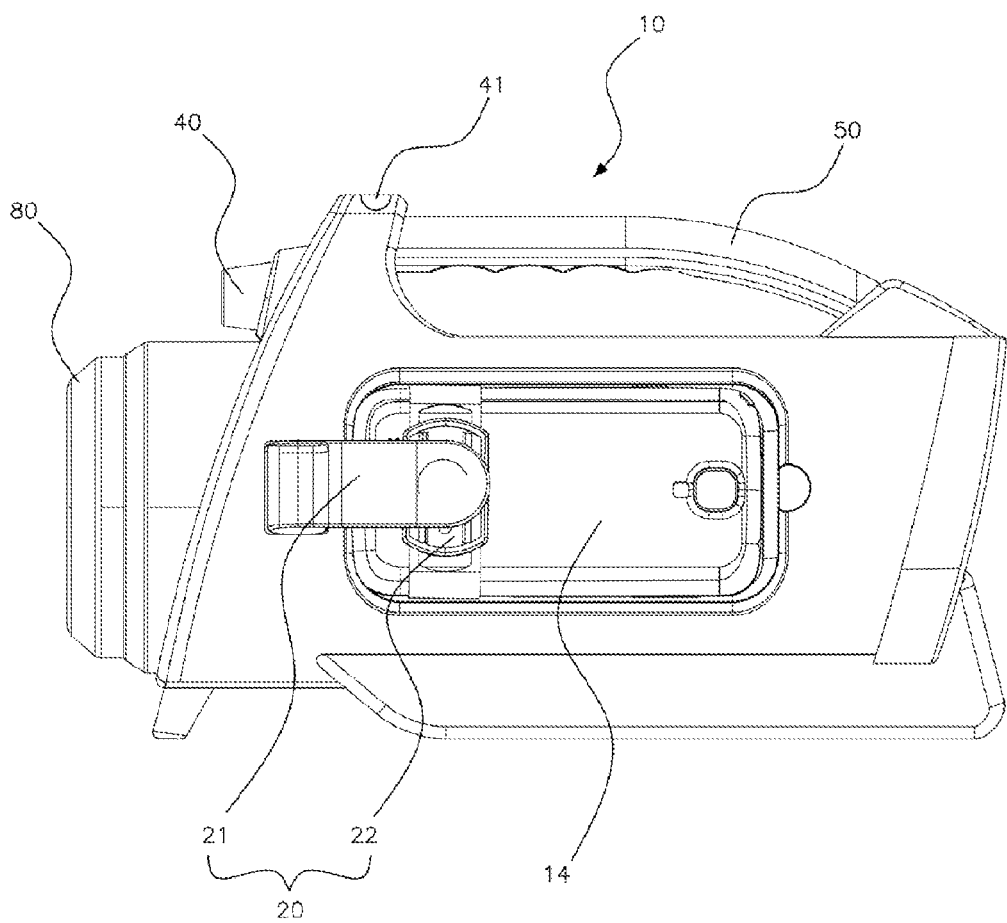
FIG. 4 is a side view of the hand-held portable system of FIG. 1 with the PDA in a closed position.

The radiation detection subsystem 12 generally includes an outer casing 16, a handle 50, a shoulder strap holder 51, calibration aid 80, and a laser 40. The laser 40 provides location information for the object under examination (i.e., the object or area that the system 10 is monitoring), and guides measuring direction. Push-button switch 41 located on the handle turns the laser on/off. The outer casing 16 includes a recessed portion 11 (FIGS. 7 and 8), which is configured to receive the PDA 14 and hold the PDA 14 in a closed position as shown in FIG. 2. The calibration aid 80 is a supplementary unit, and may include a removable potassium chloride (KCl) container, which can be used for system calibration. As shown in FIG. 3, the radiation detection subsystem 12 also includes a power switch 61 and a DC charger adaptor 62.

Figure 5:
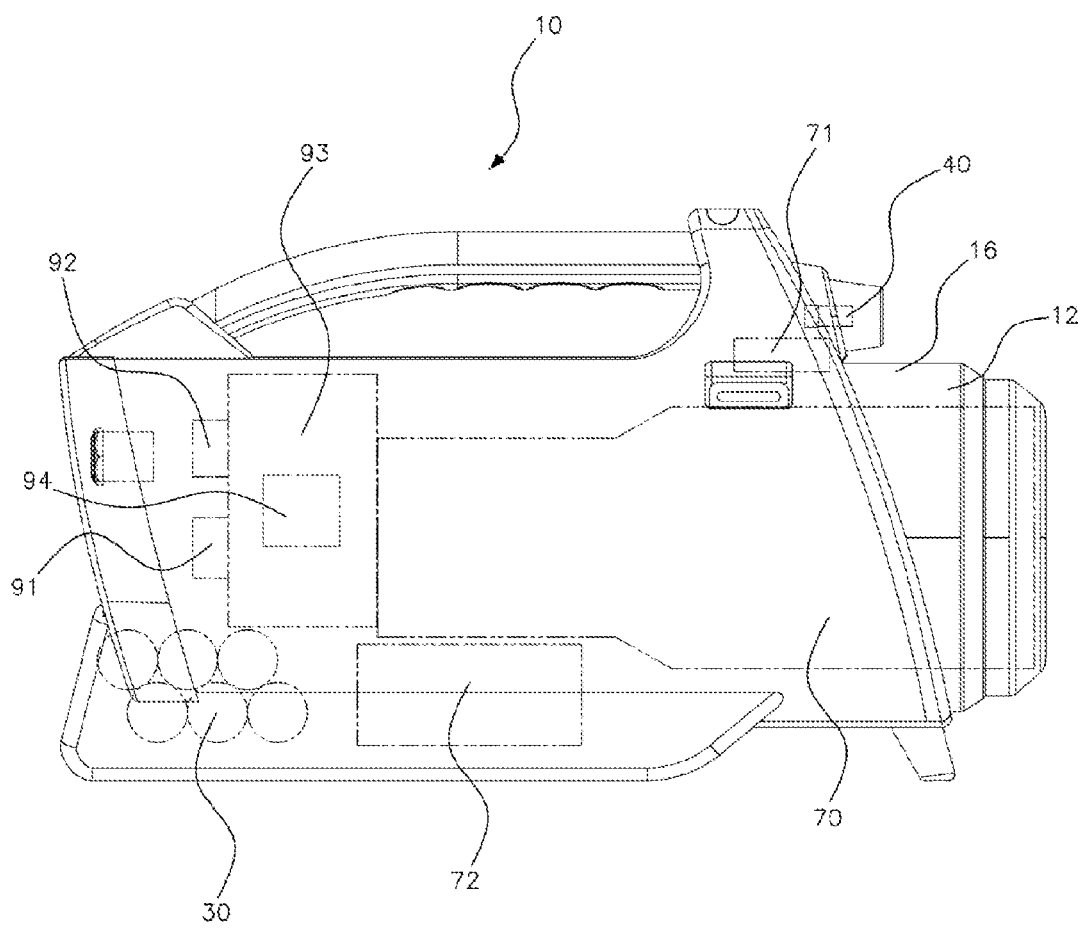
FIG. 5 is an opposite side view of the hand-held portable system of FIG. 4.
Figure 6:
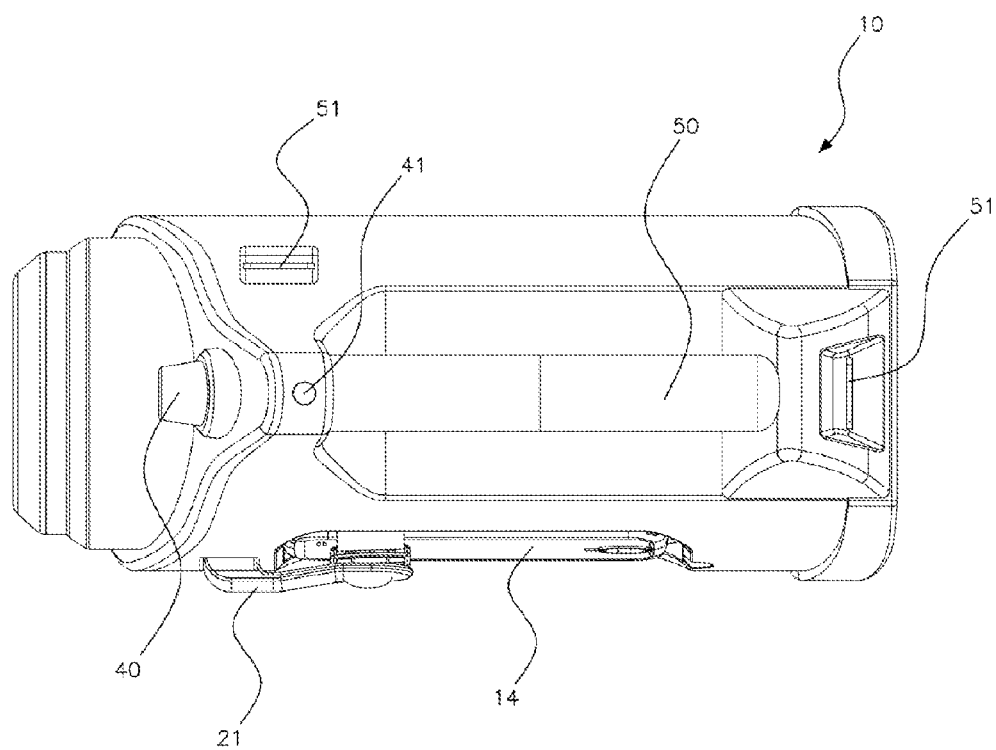
FIG. 6 is a top view of the hand-held portable system of FIG. 1.

Further, the radiation detection subsystem 12 includes internal components, which are schematically illustrated in phantom lines in FIG. 5. The radiation detection subsystem 12 may be a RIID and include at least one radiation detector. In the embodiment shown, the radiation detection subsystem 12 comprises multiple radiation detectors including an internal gamma-ray detector 70 having gamma-ray spectroscopic radiation measurement capability, a gas tube based gamma detector 71, such as GM (Geiger Muller) tube for high count-rate gamma-ray radiation dose rate measurement, and a neutron detector 72 for neutron radiation measurement.

Further, the radiation detection subsystem 12 includes a battery 30, a high voltage module 92, a front-end electronic module 93, a signal processing unit 94 and a wireless communication module 91. The rechargeable battery 30 is a power source of the radiation detection subsystem 12. The high voltage module 92 is configured to supply high voltage power to the radiation detectors 70, 71, 72 for their operation. The front-end electronics module 93 and the signal processing unit 94 are configured to process electronic signals, which are generated by the radiation detectors 70, 71, 72 when radiation is detected, and generate digitized data. The digitized data is transmitted through the wireless communication module 91 to the PDA 14.

Figure 7:
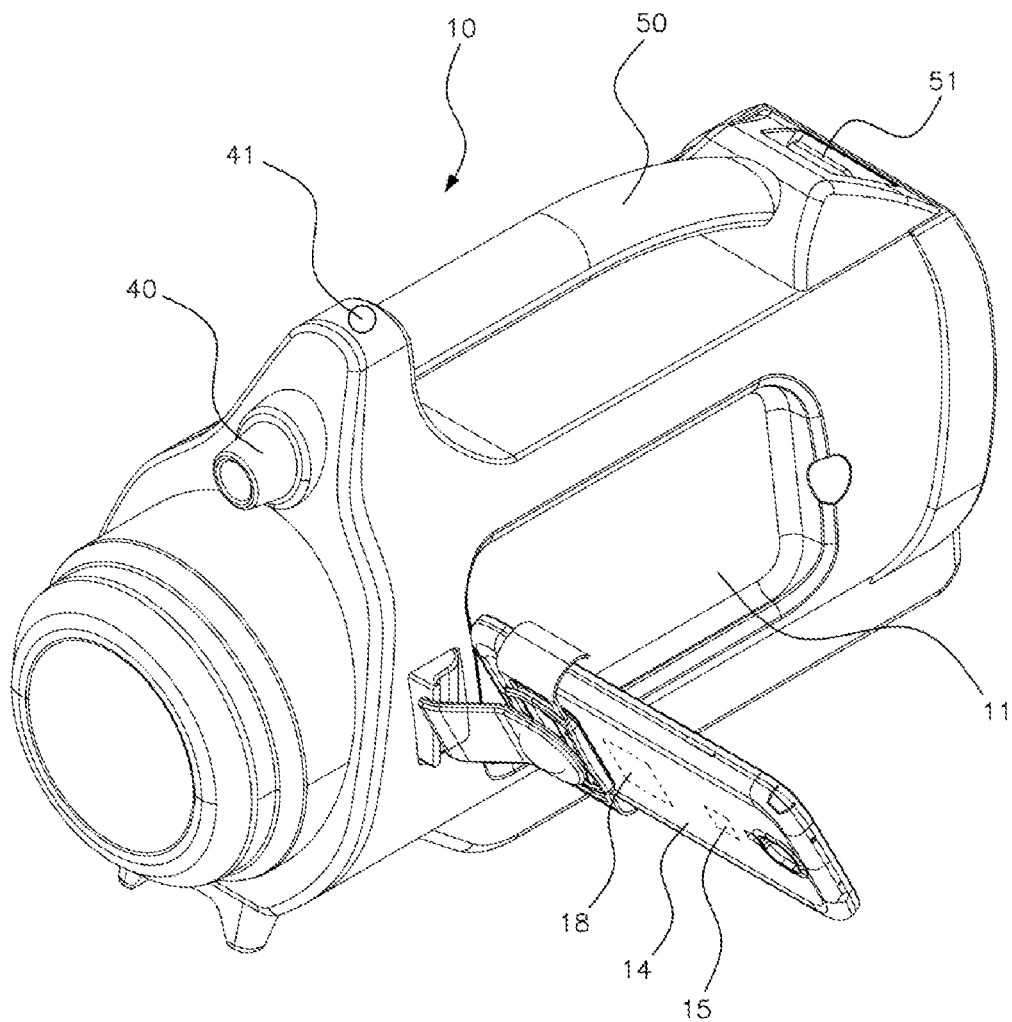
FIG. 7 is a front perspective view of the hand-held portable system of FIG. 1 with the PDA opened and held horizontally.
Figure 8:
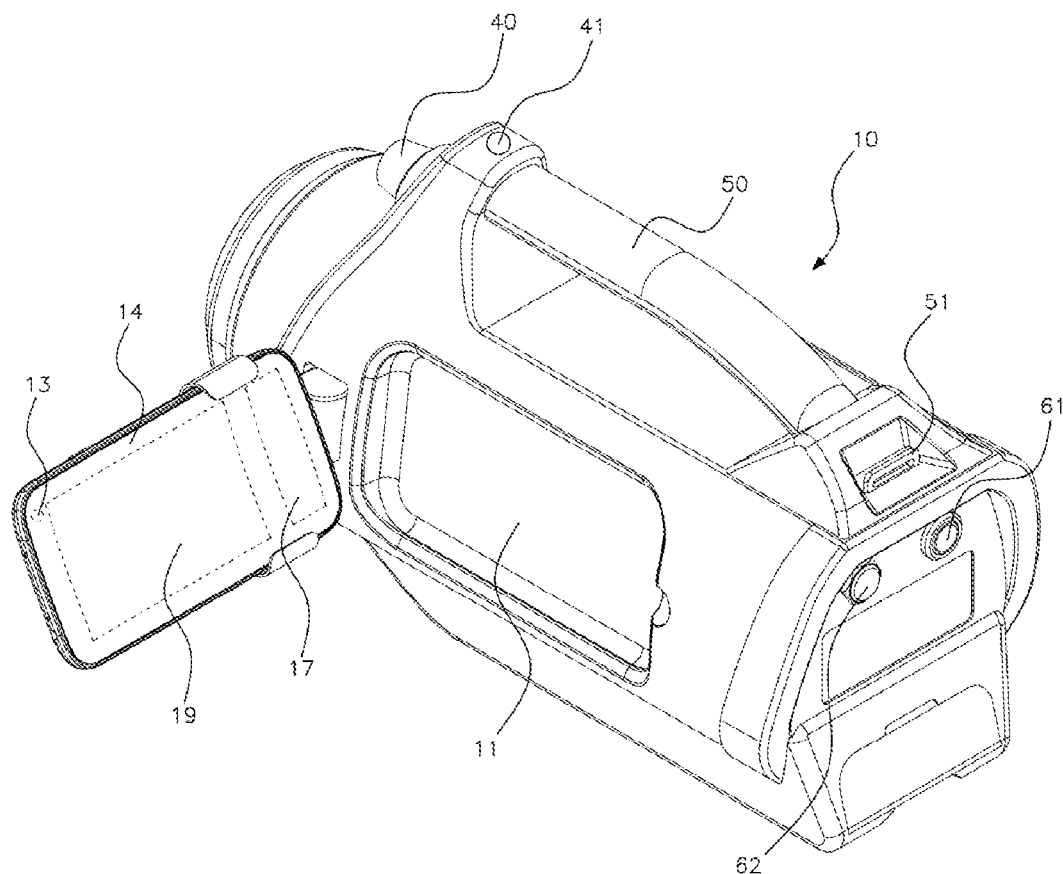
FIG. 8 is a rear perspective view of the hand-held portable system of FIG. 7 with the PDA opened and held horizontally.

The PDA 14 is configured to receive the digitized data from the radiation detection subsystem 12 via a communication unit, such as a Bluetooth communication 15 (schematically illustrated in phantom lines in FIG. 7). The digitized data is processed in an internal signal processing unit 18 (schematically illustrated in phantom lines in FIG. 7), which is configured to perform spectrum analysis, radionuclide identification and database management. In addition, the PDA 14 provides an advanced graphical user interface using built in features such as a keypad 17, a camera 13 and a display 19. (FIG. 8). The data processed by the PDA 14 may be further transferred to a separate computer system for data storage, consolidated management and analysis of data from multiple hand-held portable radiation measurement systems.

The data processing functionality and user interface functionality of the hand-held portable radiation detection system 10 is greatly enhanced by the integration of the PDA 14. For example, in performing spectroscopic analysis, the PDA 14 provides high computing power while maintaining a low cost and a small form-factor. This enables implementation of high computing powered algorithms driving real-time performance, such as radio isotope identification for single and/or multiple mixtures of radiation sources, and analysis of data acquired to report results. Further, the PDA 14 has a relatively large memory. For example, the size of random-access memory (RAM) may be few tens and hundreds of gigabyte (Gbyte), and thus, data can be stored for days or months without data backup to external storages.

The PDA 14 can include a relatively high resolution and high contrast display with thoroughly engineered touch screen features to provide a greatly enhanced user interface for displaying and taking user inputs. For example, a user can use the PDA 14 to input and control configurations of the radiation detection subsystem 12, such as calibration, background measurement, stabilization, and configuration parameter setup. The PDA 14 can also display radiation information including spectrum, count rate, dose rate, radionuclide identification results via the enhanced graphic user interface.

The PDA 14 may also be configured to utilize Bluetooth, and wireless and/or USB protocols to receive data from the radiation detection subsystem 12 and to transmit the processed data to a remote computing system with a high throughput. The PDA 14 can also provide code division multiple access (CDMA) protocol which is standardized communication protocols presented in a low-power and low-cost format in sending e-mail, text message, phone call to staffs and/or command center.

The PDA 14 may be configured to utilize a built-in global positioning system (GPS) to generate event log files including corresponding location information for radiation detected by the radiation detection subsystem 12, which can be transmitted real-time by the PDA 14 to a command center for generating an event map. Further, a built-in high-resolution camera in the PDA 14 can be used to take photos and/or videos of a target object and surrounding environment, which can be saved in an event log file and/or transmitted to the command center for the event map. Further, audible/visible, mute and vibration combined alarm features of the PDA 14 can provide enhanced user alert and flexible choice for covert search conditions.

Upgrades and performance enhancement implementations for data processing functions of the hand-held portable radiation detection system 10 are greatly simplified with the integration of a PDA. Such upgrades and enhancements can be implemented in a new PDA, smart phone or similar device, which can simply replace an existing PDA. This provides a much lower cost upgrade path than such upgrades for traditional portable hand-held radiation detection systems.

Figure 9:
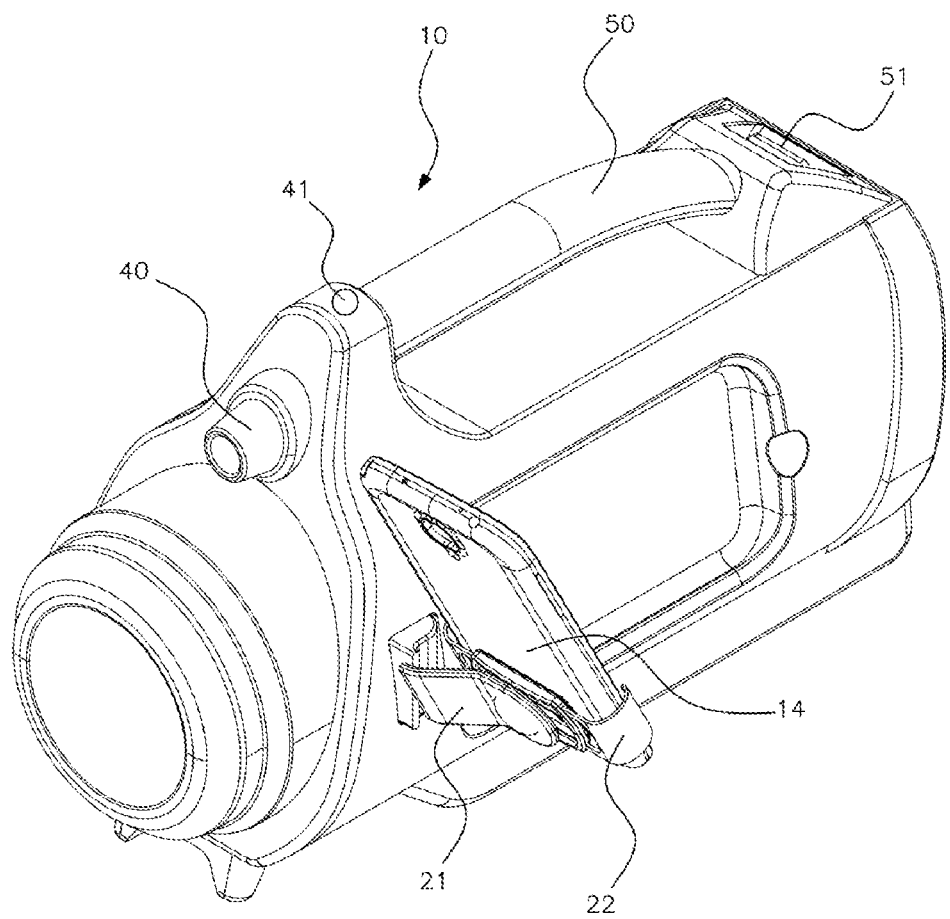
FIG. 9 is a front perspective view of the hand-held portable system of FIG. 1 with the PDA opened and held vertically.

The PDA 14 may be removed from the mounting unit 20 and carried in a pocket when necessary (e.g. covert search) or convenient. FIG. 10 shows an embodiment of the mounting unit 20. The mounting unit 20 includes a hinge 21 and a holder 22. The mounting unit 20 is attached to the radiation detection subsystem 12 via a suitable attachment element 23, such as a screw. As shown, the holder 22 is attached to one end of the hinge 21, and the radiation detection subsystem 12 is attached to the other end of hinge 21 by the attachment element 23 (FIGS. 7, 9, and 10.) The hinge 21 is configured to provide flip (to open the PDA from the closed position), tilt (for desired angle of view as shown in FIGS. 7-9) and rotation (rotating the holder 22 to rotate PDA between 0 to 90 degree for horizontal and vertical view, respectively) movements. Various holding positions of the PDA 14 enabled by the hinge movements are shown in FIGS. 4 and 7-9. Further, the holder 22 may include a spring-loaded mechanism to fit a wide range of PDA sizes.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A portable radiation detection system, comprising:
a radiation detection subsystem including:
at least one radiation detector configured to detect, radiation and generate electronic signals;
a first signal processing unit configured to process the electronic signals and generate digitized data;
a first communication unit configured to transmit the digitized data;
wherein the at least one radiation detector, the first signal processing unit, and the first communication unit are housed in an outer casing;
a personal digital assistant (RDA) including:
a second signal processing unit configured to process the digitized data received from the radiation detection subsystem;
a user interface unit;
a second communication unit configured to communicate with the first communication unit to receive the digitized data;
a mounting unit attached to the outer casing and configured to hold the PDA, and wherein the outer casing includes a recessed portion configured to receive the PDA therein in a closed position, wherein the mounting unit includes a hinge, a holder, and an attachment element, wherein the holder is attached to one end of the hinge, and the outer casing is attached to the opposite end of the hinge via the attachment element, wherein the holder is configured to hold the PDA.

2. The portable radiation detection system of claim 1, wherein the at least one radiation detector includes a gamma-ray detector having gamma-ray spectroscopic radiation measurement capability, a gas tube based gamma detector for measuring high count-rate gamma-ray radiation, and a neutron detector for measuring neutron radiation.

3. The portable radiation detection system of claim 1, wherein the radiation detection subsystem further includes a high voltage module configured to supply high voltage power to the at least one radiation detector.

4. The portable radiation detection system of claim 1, wherein the second signal processing unit is configured to perform spectroscopic analysis and radionuclide identification process.

5. The portable radiation detection system of claim 4, wherein the second signal processing unit further performs database management function.

6. The portable radiation detection system of claim 4, wherein the second signal processing unit generates event log files after processing the digitized data received from the radiation detection subsystem through the spectroscopic analysis and the radionuclide identification process.

7. The portable radiation detection system of claim 6, wherein the event log files are transmitted to a remote computer system for consolidated analysis and management of data from multiple portable radiation detection systems.

8. The portable radiation detection system of claim 1, wherein the first communication unit is a wireless communication module, and the second communication unit is wireless communication module, wherein the first communication unit and the second communication unit are configured to communicate with each other to transmit and receive data between the radiation detection subsystem and the PDA, wherein the second communication unit is configured to communicate with a communication unit of a remote computer system to transmit and receive data between the PDA and the remote computer system.

9. The portable radiation detection system of claim 1, wherein the user interface unit includes a keypad, a display and a camera.

10. The portable radiation detection system of claim 9, wherein the PDA is configured to receive user input via the user interface unit, and generate and transmit signals to the radiation detection subsystem to control configurations of the radiation detection subsystem including calibration, background measurement, stabilization, and configuration parameter setup.

11. The portable radiation detection system of claim 9, wherein the second signal processing unit is configured to generate event log files after processing the digitized data, wherein the camera takes pictures and/or videos of a target and/or surrounding environment, wherein the PDA is configured to save the pictures and/or videos in the event log files, wherein the PDA transfers the event log files to a command center for generating a radiation event map.

12. The portable radiation detection system of claim 1, wherein the PDA includes a global positioning system (GPS), wherein the second signal processing unit is configured to generate event log files after processing the digitized data, wherein the event log files include a corresponding location information received from the GPS, wherein the PDA transfers the event log files to a command center for generating a radiation event map.

13. The portable radiation detection system of claim 1, wherein the mounting unit is attached to the outer casing approximate the recessed portion, such that the PDA in the holder carl be opened and closed by a movement of the mounting unit, and the PDA can be positioned in the recessed portion in the closed position.

14. The portable radiation detection system of claim 1, wherein the mounting unit is configured to provide a flip motion to open and close the PDA, a tilt motion to adjust a position of the PDA, and a rotational movement for changing a holding position of the PDA between a horizontal holding position and a vertical holding position.

15. The portable radiation detection system of claim 1, wherein the radiation detection subsystem further includes a calibration aid unit and a laser unit for guiding measuring direction.

16. The portable radiation detection system of claim 1, wherein the radiation detection subsystem is a radiation isotopic identification device (RIID).

17. The portable radiation detection system of claim 1, wherein the PDA is a smart phone.

* * * * *